United States Patent [19]
Shen

[11] Patent Number: 5,171,194
[45] Date of Patent: Dec. 15, 1992

[54] BIFURCATED VARIABLE RATIO TRANSMISSION

[76] Inventor: Xing L. Shen, 2137 E. 21st St., Brooklyn, N.Y. 11229

[21] Appl. No.: 743,242

[22] Filed: Aug. 9, 1991

[51] Int. Cl.⁵ .......................... F16H 3/50; F16H 3/56; F16H 3/70; F16H 3/74
[52] U.S. Cl. .................. 475/330; 475/230; 475/242; 475/248; 475/252
[58] Field of Search ............... 475/220, 221, 329, 330, 475/331, 204, 206, 319, 325, 242, 248, 252

[56] References Cited

U.S. PATENT DOCUMENTS

| | | | |
|---|---|---|---|
| 2,641,143 | 6/1953 | Saraceni | 475/330 |
| 3,429,200 | 2/1969 | Green | 475/330 |
| 4,235,125 | 11/1980 | Perlin | 475/254 |
| 4,334,440 | 6/1982 | Fonck | 475/330 |
| 4,598,610 | 7/1986 | Kim | 475/330 |
| 4,625,588 | 12/1986 | Brickley | 475/325 |
| 4,700,589 | 10/1987 | Coronel | 475/330 X |
| 4,854,190 | 8/1989 | Won | 475/5 |
| 4,916,975 | 4/1990 | Combastet | 475/111 |
| 5,013,289 | 5/1991 | Van Maanen | 475/330 X |

FOREIGN PATENT DOCUMENTS

| | | | |
|---|---|---|---|
| 3045080 | 7/1982 | Fed. Rep. of Germany | 475/330 |
| 1490360 | 6/1989 | U.S.S.R. | 475/330 |
| 2162259 | 1/1986 | United Kingdom | 475/330 |

*Primary Examiner*—Leslie A. Braun
*Assistant Examiner*—David E. Henn
*Attorney, Agent, or Firm*—Natter & Natter

[57] ABSTRACT

A bifurcated variable ratio drive transmission employs a pair of series connected differential gear stages. In a fist stage, torque flow from the engine output shaft is bifurcated into major and minor flow branches; in the second stage, the branches are combined. An engine output shaft drives an input ring gear of the first stage with the ring gear engaging a plurality of stepped planet gears. The planet gears in turn, drive both a sun gear of the first stage and a transfer ring gear. A major portion of torque flow is transmitted to the second stage through the transfer ring gear while a minor portion of torque flow passes from the sun gear of the first stage to the sun gear of the second stage. The transfer ring gear is fixed to a carrier to which are mounted pairs of radially spaced interengaged planet gears. Torque flow from the sun gear is amplified through the second stage planet gear pairs and combined with torque flow from the second stage carrier to drive the second stage ring gear which is connected to an output shaft.

16 Claims, 5 Drawing Sheets

BIFURCATED VARIABLE RATIO TRANSMISSION

BACKGROUND OF THE INVENTION

1. Field of the Invention

This invention relates generally to transmissions interconnecting a rotary power source with a driven element under varying torque loads and more particularly to a stepless variable ratio transmission.

2. Related History

Automatic transmission drives heretofore adapted for commercial use in vehicular systems generally included a fluid coupling such as a torque converter which provided a controlled slip coupling between an engine or motive output shaft and a gear shift transmission unit. The transmission unit was adapted for shiftable configuration into a plurality of fixed gear ratios. Shifting, engagement and selection of gear ratios were controlled by fluid and/or electrical systems.

Such prior automatic transmission drives were subject to numerous disadvantages including their bulk or size, weight and the complicated nature of required shifting and control systems. Furthermore, prior transmission drives required continuous maintenance and the replacement or repair of various wear prone components such as bands, seals, torque converters and the like. Attempts at providing stepless transmission drives with or without fluid couplings proved commercially unfeasible. The products of such attempts suffered from the inability to generate an acceptable range of torque ratios, the inability to attain a vehicle brake condition without engine stall or without the use of a fluid coupling and the inability to attain a one to one or overdrive ratio at vehicle cruising speed. Further, the range of available ratios necessary to generate adequate torque for efficient operation under variant torque loads, e.g. from a vehicle stopped position to cruising speed, was not possible.

SUMMARY OF THE INVENTION

A bifurcated variable ratio drive transmission employs a pair of planetary gear stages which interconnect an engine output shaft and a vehicle drive shaft. In a first stage, torque flow from the output shaft is bifurcated into major and minor branches; in a second stage, the branches are combined with torque flow from the minor branch being amplified. An input ring gear of the first stage is driven by the output shaft and engages a first step of a plurality of stepped planet gears. The second step of the planet gears is of larger diameter and drives both a sun gear and a transfer ring gear. A major portion of torque flow is transmitted to the second stage through the transfer ring gear while a minor portion of torque flow passes directly from the first stage sun gear to a second stage sun gear. The transfer gear is fixed to a planet carrier of the second stage which carries radially spaced interengaged planet gear pairs. Torque flow from the sun gear is amplified through the planet gear pairs and combined with torque flow from a second stage carrier to drive the second stage ring gear which is fixed to a transmission output shaft.

From the foregoing compendium, it will be appreciated that it is a consideration of the present invention to provide a variable ratio transmission which is not subject to the disadvantages of the background history aforementioned.

A further consideration of the present invention is to provide a variable ratio transmission of the general character described which is capable of producing a wide range of ratios for generating adequate torque for vehicle propulsion under varying torque loads.

An aspect of the present invention is to provide a variable ratio transmission of the general character described which is capable of operating without a fluid coupling from a vehicle stop state through full cruising speed wherein the ratio between the engine and the driven element is one to one.

To provide a variable ratio transmission of the general character described which is relatively compact and well suited for automotive applications is a feature of the present invention.

Yet another feature of the present invention is to provide a variable ratio transmission of the general character described which is low in weight and thus serves to increase vehicle fuel efficiency.

An aspect of the present invention is to provide a variable ratio transmission of the general character described which employs a pair of series interconnected planetary gear stages capable of achieving a one to one ratio at cruising speeds.

A still further consideration of the present invention is to provide a variable ratio transmission of the general character described which includes a pair of series connected planetary gear stages wherein a major portion of torque flow is transmitted from a first stage to a second stage through a transfer ring gear.

A further feature of the present invention is to provide a variable ratio transmission of the general character described which is well suited for economical mass production fabrication.

To provide a variable ratio transmission of the general character described which is relatively low in cost is yet another aspect of the present invention.

Other aspects, features and considerations in part will be obvious and in part will be pointed out hereinafter.

With these ends in view, the invention finds embodiment in the various combinations of elements, arrangements of parts and series of steps by which the said invention is achieved, all with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENTS

Figure 2:
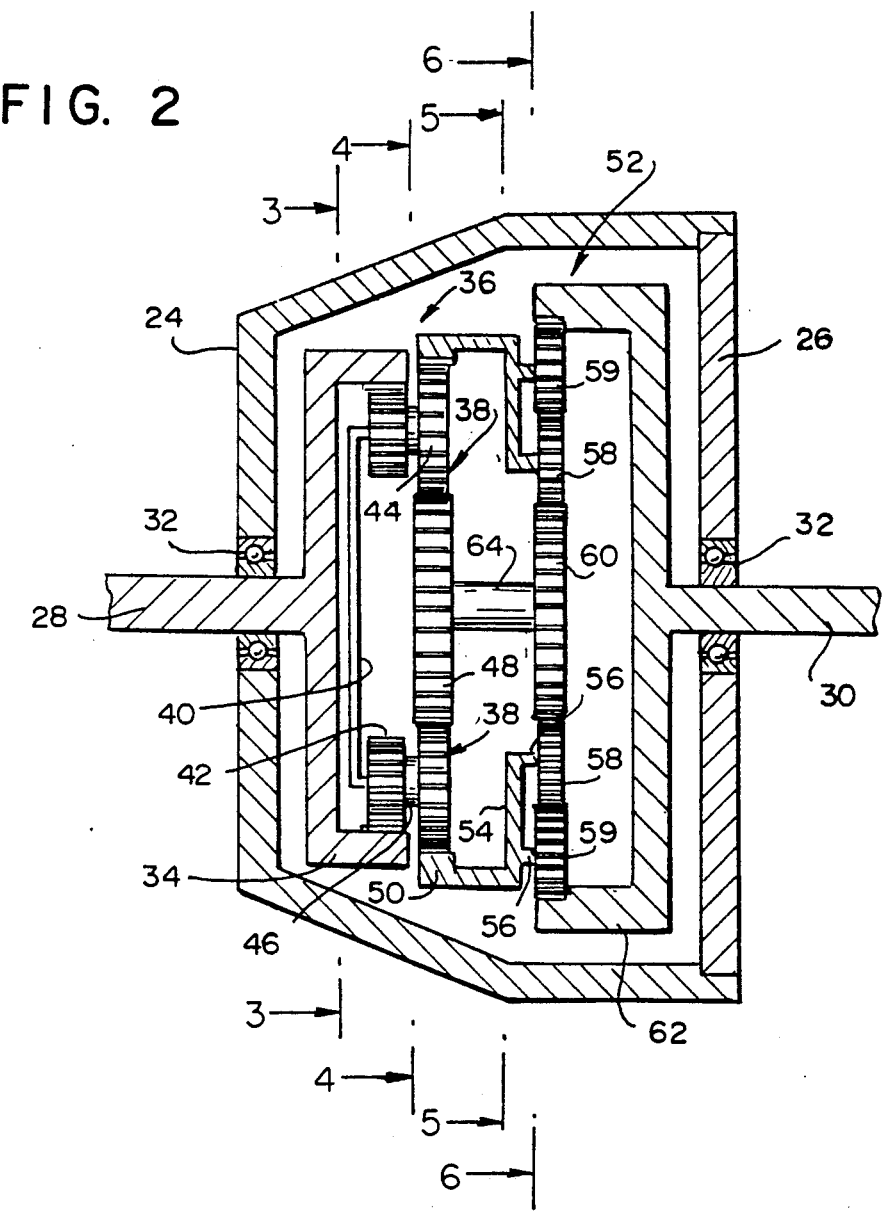
FIG. 2 is an enlarged scale longitudinal sectional view through the bifurcated variable ratio transmission, the same being taken substantially along the line 2—2 of FIG. 1 and illustrating the transmission as including a pair of planetary gear stages.
Figure 1:
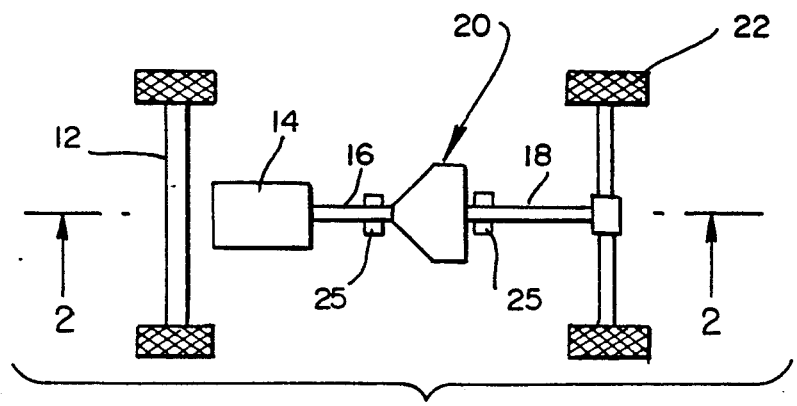
FIG. 1 is a schematized representation of a vehicle having a bifurcated variable ratio transmission constructed in accordance with and embodying the invention interconnecting an engine and vehicle propulsion wheels.
Figure 3:
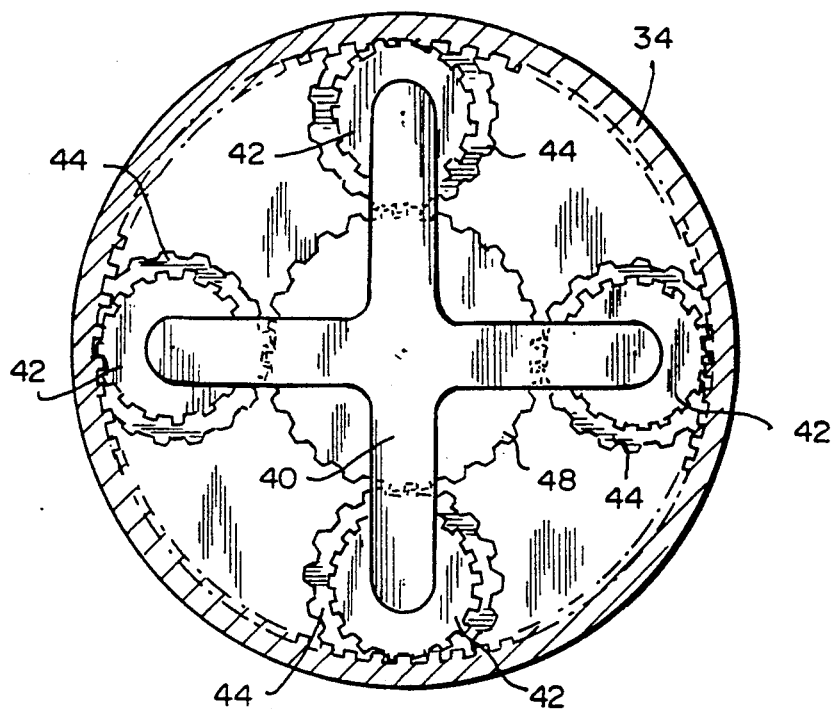
FIG. 3 is an enlarged scale transverse sectional view through the transmission, with a transmission casing and other components deleted for clarity, and showing a first stage planetary gear with an input ring gear engaging a first step of a plurality of stepped planet gears.

With reference now in detail to the drawings, the reference numeral 10 denotes generally a vehicle having a drive system 12 for propulsion over or through a supporting or surrounding medium. The drive system 12 includes a motor, engine, or other power source 14 having a rotary output shaft 16 and a drive shaft 18 through which requisite output torque is supplied to a suitable propulsion device such as wheels 22 in contact with a support surface or medium over which the vehicle is to be propelled. Interconnecting the engine output shaft 16 and the drive shaft 18 is a bifurcated variable ratio transmission 20 constructed in accordance with and embodying the invention.

The transmission 20 is carried within a casing which may comprise a front shell 24 and a rear cover 26, suitably configured for component assembly. A transmission input shaft 28, coupled to the output shaft 16 by a universal or constant velocity joint 25, for example, extends through a suitable aperture in the front shell 24 while a transmission output shaft 30 extends through a suitable aperture in the rear cover 26. Seated in the apertures of the front shell and rear cover are suitable bearings 32.

The bifurcated variable ratio transmission is comprised of two planetary gear stages. Accordingly, the transmission 20 includes a first stage planetary gear 36 which is driven by an input ring gear 34 and which serves to bifurcate torque flow from the engine output shaft 16 into major and minor branches. The utilization of the ring gear 34 at the input of the first stage planetary gear 36 facilitates torque bifurcation at the first stage while minimizing size and mass of the transmission 20.

Figure 4:
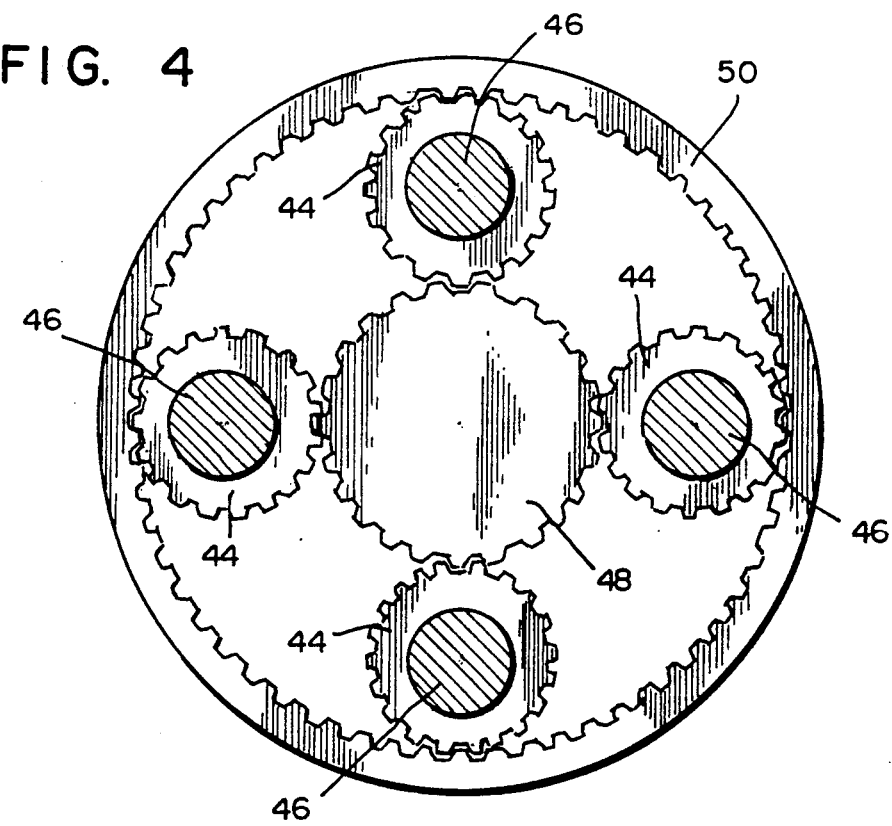
FIG. 4 is an enlarged scale transverse sectional view through the transmission, the same being taken substantially along the line 4—4 of FIG. 2 with portions deleted for clarity and showing a second step of each planet gear engaging both a transfer ring gear and a sun gear.

The first stage planetary gear 36 includes a plurality of planet gears 38 mounted to axial shafts of a carrier 40. Each planet gear 38 includes a first and a second axially spaced step, 42, 44 respectively. The first step 42, has a pitch diameter less than that of the second step 44. Internal teeth of the input ring gear 34 are in engagement with the teeth of the first step 42. A concentric hub 46 joins the steps 42, 44 as illustrated in FIGS. 2 and 4 and the teeth of the second step 44 are in mutual engagement with both the teeth of a first stage sun gear 48 and a transfer ring gear 50.

In accordance with the invention, torque from the engine output shaft 16 is bifurcated into a major portion which is transmitted through the transfer ring gear 50 to a second stage planetary gear 52 and a minor portion which is transmitted to the second stage planetary gear 52 through the sun gear 48.

Figure 5:
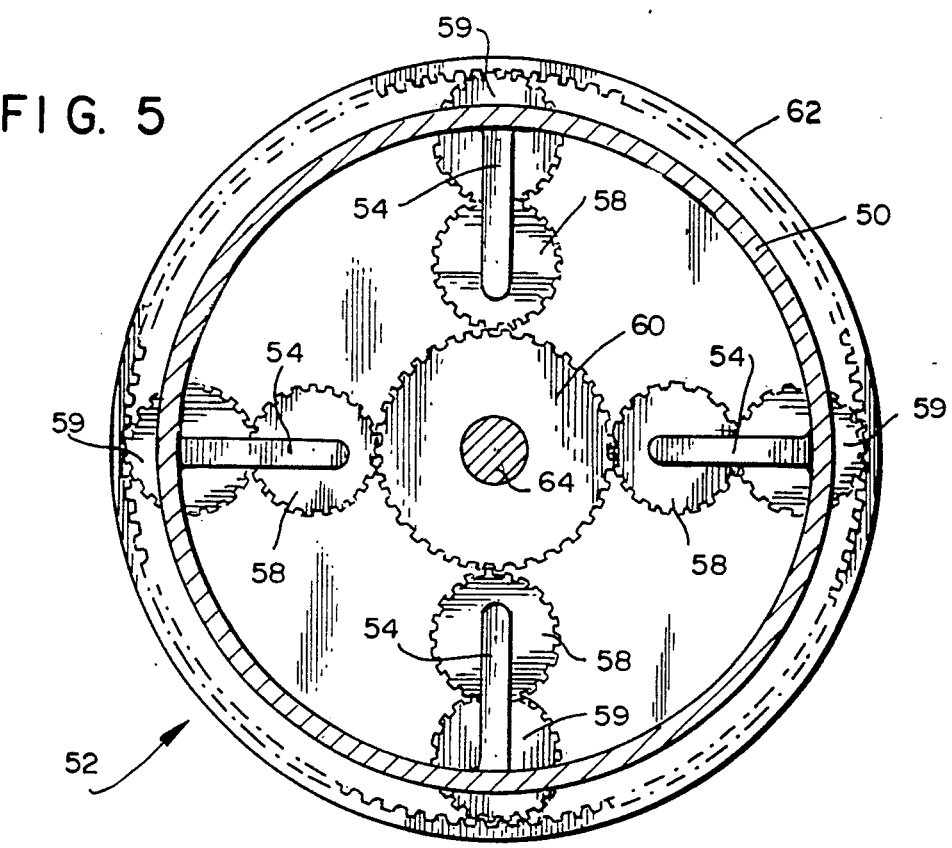
FIG. 5 is an enlarged scale transverse sectional view through the transmission, the same being taken substantially along the line 5—5 of FIG. 2 and illustrating a second stage planetary gear with a planet carrier fixed to the transfer ring gear and carrying radially spaced interengaged planet gear pairs with the radially innermost planet gear of each pair engaging a sun gear of the second stage planet gear and the radially outermost planet gear of each pair engaging an output ring gear.
Figure 6:
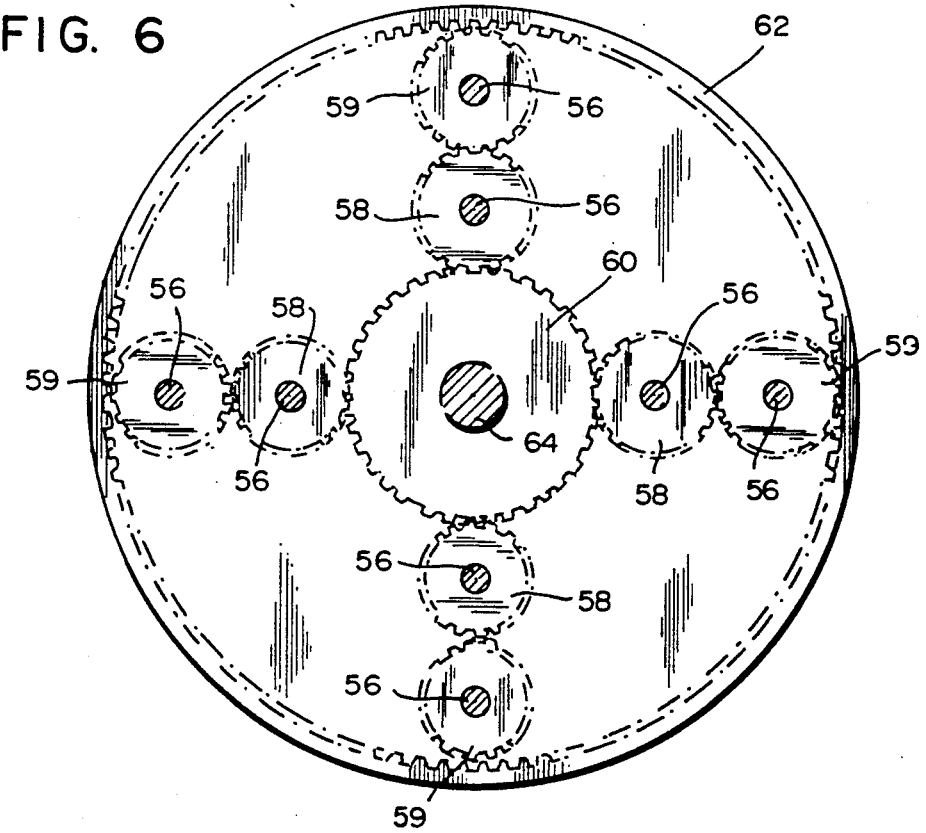
FIG. 6 is an enlarged scale sectional view through the transmission, the same being taken substantially along the line 6—6 of FIG. 2 and through the carrier shafts about which the planet gears rotate.

As will be noted from an examination of FIG. 5 wherein the second stage planetary gear 52 is depicted, a second stage input carrier 54 is fixed to the transfer ring gear 50 and carries a plurality of interengaged pairs of planet gears 58, 59. The planet gears 58, 59 of each of the pairs are radially spaced from one another and rotate about axial shafts 56 which extend from the carrier 54.

The teeth of the radially innermost planet gear 58 of each pair are in engagement with the teeth of a second stage sun gear 60 which, in turn, is driven by the first stage sun gear 48 with both sun gears 48, 60 being fixed to a common shaft 64. The radially outermost planet gear 59 is in engagement with an output ring gear 62 which, in turn, is fixed to the transmission output shaft 30.

Pursuant to the invention, requisite output torque for vehicle acceleration and propulsion is provided by combining the minor component of bifurcated torque applied to the planet gear pairs through the sun gear 60, with the major component of torque applied to the planet gear pairs through the transfer ring gear 50 and the second stage carrier 54.

The utilization of pairs of radially spaced planet gears 58, 59 in the second stage not only serves to provide the ability for maintaining rotation of the input shaft 28 and output shaft 30 in the same rotary direction during forward propulsion of the vehicle but, in addition, serves to permit the transmission 20 to achieve a one to one direct drive ratio between the engine output shaft 16 and the vehicle drive shaft 18 at low torque load cruising speeds.

As previously mentioned with respect to the connection between the engine output shaft 16 and the transmission input shaft 28, a universal or constant velocity joint 25 may also be utilized to interconnect the transmission output shaft 30 with the vehicle drive shaft 18.

Suggested typical gear components include an input ring gear 34 with sixty teeth, a first step 42 of the planet gear with twelve teeth, a second step 44 of the planet gear with twenty-four teeth, a transfer ring gear 50 with seventy-two teeth and a sun gear 48 with 24 teeth. With respect to the second stage planet gear 52, radially innermost planet gears 58 with twenty-one teeth, radially outermost planet gears 59 with eighteen teeth, a sun gear 60 with twenty-one teeth and an output ring gear 62 with ninety-six teeth. Such gearing will result in a transmission with a maximum torque ratio of 2:1 with the ratio being variable over operating speeds to a cruising speed ratio of 1:1.

If higher torque ratios are necessary for particular applications, a pair of transmissions 20 may be series connected. Alternately, torque ratios in excess of 2:1 may be achieved by employing a torque amplification gear train between the first and second stage planetary gear trains in accordance with an alternate embodiment of the invention depicted in FIG. 7.

Figure 7:
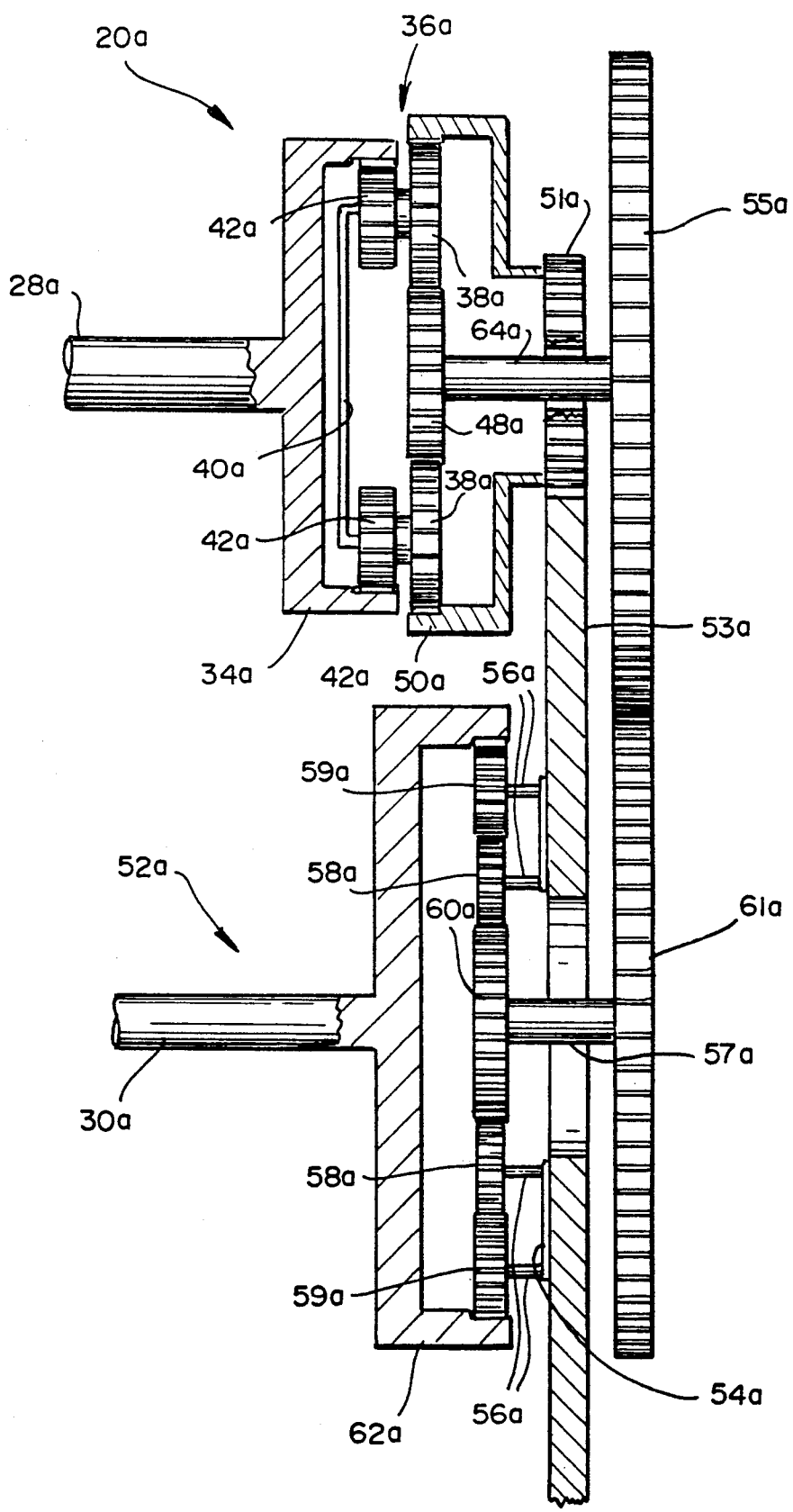
FIG. 7 is a longitudinal sectional view similar to that of FIG. 2 taken through an alternate embodiment of the invention wherein higher torque amplification ratios are achieved by providing a torque amplifying gear train between the first and second stage planetary gear trains.

In the embodiment of FIG. 7, like numerals have been employed to denote like components of the prior embodiment, bearing the suffix "a", however. In this embodiment, a bifurcated variable ratio transmission 20a is comprised of a first stage planetary gear 36a and a second stage planetary gear 58a, each substantially identical to that described with reference to the prior embodiment except for the components which transfer torque flow from the first stage to the second stage. A transmission casing has not been illustrated for clarity.

The first stage planetary gear 36a is driven by an input ring gear 34a. A plurality of planet gears 38a mounted to axial shafts of a carrier 40a are provided. Each planet gear 38a includes a first and a second axially spaced step 42a, 44a, respectively. The first step 42a has a pitch diameter less than that of the second step 44a. Internal teeth of the ring gear 34a are in engagement with the teeth of the first step 42a and the teeth of the second step 44a are in mutual engagement with both the teeth of a first stage sun gear 48a and a transfer ring gear 50a.

Input torque is bifurcated at the first stage planetary gear 36a into a major portion which is transmitted from the transfer ring gear 50a to the second stage planetary gear 52a and a minor portion which is transmitted from the sun gear 48a.

As will be noted from an examination of FIG. 7, the transfer ring gear 50a differs from the transfer ring gear of the prior embodiment. Fixed to and coaxial with the transfer ring gear 50a is a spur gear 51a of a torque amplifying gear train. The spur gear 51a engages and drives a spur gear 53a of the second stage planetary gear 52a. Fixed to the spur gear 53a are a plurality of radially spaced axial shafts 56a each of which carries one of a pair of a plurality of interengaged planet gears 58a, 59a. The spur gear 53a and the axial shafts 56a thus comprise a second stage input carrier 54a. The interengaged spur gears 51a, 53a provide torque amplification between the first and second stage planetary gears.

Coaxial with the sun gear 48a of the first stage planetary gear 36a is a shaft 64a which carries a spur gear 55a. Similarly, a sun gear 60a of the second stage planetary gear 52a is fixed to a shaft 57a and a spur gear 61a is also fixed to the shaft 57a. The spur gears 55a, 61a interengage one another to interconnect the sun gear 48a of the first stage planetary gear with the sun gear 60a of the second stage planetary gear.

Figure 8:
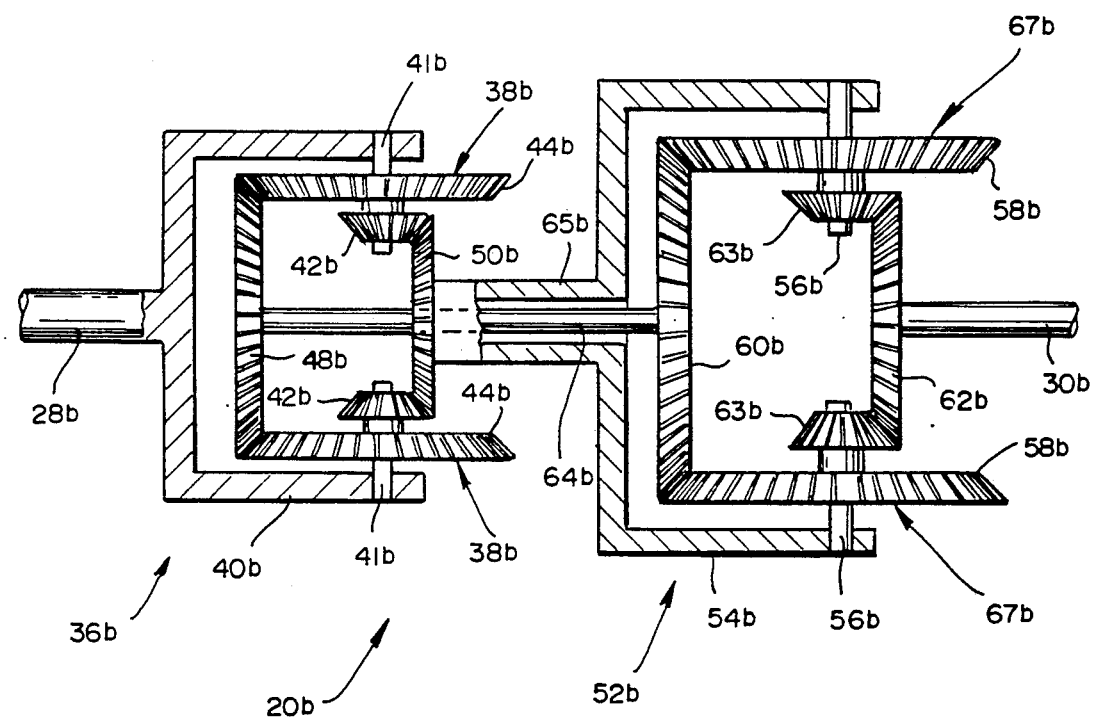
FIG. 8 is a longitudinal sectional view of a still further embodiment of the invention wherein the differential gears are not planetary gears.

Turning now to FIG. 8 wherein a still further embodiment of the invention is disclosed, such further embodiment illustrates a typical application of the principles of the present invention utilizing, in lieu of planetary gear stages, a first and a second stage, each comprising a differential gear with bevel gears. Referring now in detail to the drawing it should be observed that like numerals have been employed to refer to functionally corresponding components relative to the previously described embodiments, bearing the suffix "b", however.

A bifurcated variable ratio transmission 20b includes an input shaft 28b, which drives a first stage differential gear 36b. The differential gear 36b bifurcates torque flow into major and minor branches. The input shaft 28b is fixed to a cage or carrier 40b having one or more pairs of coaxial pins 41b radially and transversely oriented relative to a longitudinal axis of the transmission 20b.

Carried on each of the pins 41b is a stepped bevel gear 38b. The bevel gear 38b is rotatable relative to the cage 40b and about the axis of the pins 41b. A first, minor diameter, step 42b of each bevel gear 38b is in driving engagement with a transfer bevel gear 50b which serves to transfer a major component of the bifurcated torque flow from the first stage differential gear 36b to a second stage differential gear 52b.

A second, major diameter, step 44b of each bevel gear 38b engages and drives a further bevel gear 48b fixed to a shaft 64b which is coaxial with the longitudinal axis of the transmission 20b. The further bevel gear 48b serves to transfer a minor portion of the torque flow from in the input shaft 28b to the second stage differential gear 52b.

The second stage differential gear 52b includes a cage 54b which rotates unitarily with the transfer bevel gear 50b and is joined to such transfer bevel gear through a hollow shaft 65b. Carried on the cage 54b are at least one pair of coaxial pins 56b which are oriented radially and transversely from the longitudinal axis of the transmission.

Each of the pins 56b carries a stepped bevel gear 67b which is rotatable relative to the cage 54b and about the axis of the pins 56b.

A major diameter step 58b of each bevel gear 67b is engaged by a further bevel gear 60b which is fixed to a shaft 64b. The shaft 64b extends through the hollow shaft 65b and is also fixed to the further bevel gear 48b of the first stage differential gear.

A second, minor diameter, step 63b of each bevel gear 67b engages and drives an output bevel gear 62b to which a transmission output shaft 30b is fixed.

It should be appreciated that the major portion of bifurcated torque flow from the first stage differential gear 36b to the second stage differential gear 52b is carried through the transfer bevel gear 50b, the hollow shaft 65b and the carrier 54b while the minor portion of bifurcated torque flow is carried from the bevel gear 48b through the shaft 64b and to the bevel gear 60b of the second stage differential gear.

Torque amplification of the minor portion of torque flow is provided through the reduced diameter of the minor diameter step 63b which is combined with torque flow from the carrier 54b and serves to drive the output bevel gear 62b.

As various changes might be made in the illustrative embodiments herein disclosed without departing from the spirit of the invention, it is to be understood that all matter herein described or shown in the accompanying drawings is to be interpreted as illustrative and not in a limiting sense.

Thus it will be seen that there is provided a bifurcated variable ratio transmission which achieves the various aspects, features and considerations of the present invention and which is well suited to meet the conditions of practical usage.

Having thus described the invention there is claimed as new and desired to be secured by Letters Patent:

1. A variable ratio transmission, the transmission including a first stage differential gear, the first stage differential gear having a sun gear, a plurality of planet gears and a transfer ring gear, the planet gears engaging the sun gear and the transfer ring gear, means for interconnecting the planet gears with a rotary input, the first stage differential gear bifurcating the torque of the rotary input into a major torque flow branch and a minor torque flow branch, the major torque flow branch extending through the transfer ring gear and the minor torque flow branch extending through the sun gear, the variable ratio transmission further including a second stage differential gear, the second gear differential gear comprising a sun gear, a plurality of planet gears, a planet gear carried and an output ring gear, the planet gears of the second stage differential gear engaging the sun gear and the output ring gear, the transmission further including means drivingly interconnecting the sun gear of the first stage differential gear with the sun gear of the second stage differential gear for unitary rotation, means directly connecting the transfer ring gear with the planet gear carrier of the second stage differential gear for unitary rotation and means drivingly interconnecting the output ring gear with a variable torque load, the major torque flow branch extending from the transfer ring gear through the planet gears of the second stage differential gear to the output ring gear, and the minor torque flow branch extending from the sun gear of the first stage differential gear through the sun gear of the second stage differential gear, and from the sun gear of the second stage differential gear through the planet gears of the second stage differential gear to the output ring gear and being amplified and combined with the major torque flow branch through engagement between the sun gears, the planet gears and the output ring gear of the second stage differential gear.

2. A variable ratio transmission as constructed in accordance with claim 1 wherein the first stage differential gear and the second stage differential gear are coaxial gears.

3. A variable ratio transmission as constructed in accordance with claim 1 wherein the means interconnecting the planet gears of the first stage differential gear with the rotary input comprises an input ring gear driven by the rotary input, each of the planet gears of the first stage differential gear comprising a first and a second axially spaced step, the first step having gear teeth and the second step having gear teeth, the gear teeth of the first step having a smaller pitch diameter than the gear teeth of the second step, the gear teeth of the first step engaging the input ring gear, the gear teeth of the second step engaging both the transfer ring gear and the sun gear of the first stage differential gear.

4. A variable ratio transmission as constructed in accordance with claim 3 wherein the planet gear carrier of the second stage includes means for mounting the planet gears of the second stage in mutually engaged pairs.

5. A variable ratio transmission as constructed in accordance with claim 1 wherein the planet gear carrier of the second stage includes means for mounting the planet gears of the second stage in mutually engaged pairs.

6. A variable ratio transmission, the transmission including a first stage differential gear, the first stage differential gear having a sun gear, a plurality of planet gears and a transfer ring gear, the planet gears engaging the sun gear and the transfer ring gear, means for interconnecting the planet gears with a rotary input, the means for interconnecting the planet gears of the first stage differential gear with the rotary input comprising an input ring gear driven by the rotary input, each of the planet gears of the first stage differential gear comprising a first and a second axially spaced step, the first step having gear teeth and the second step having gear teeth, the gear teeth of the first step having a smaller pitch diameter than the gear teeth of the second step, the gear teeth of the first step engaging the input ring gear, the gear teeth of the second step engaging both the transfer ring gear and the sun gear of the first stage differential gear, the first stage differential gear bifurcating the torque of the rotary input into a major torque flow branch and a minor torque flow branch, the major torque flow branch extending through the transfer ring gear and the minor torque flow branch extending through the sun gear, the variable ratio transmission further including a second stage differential gear, the second stage differential gear comprising a sun gear, a plurality of planet gears and an output ring gear, the planet gears of the second stage differential gear engaging the sun gear and the output ring gear, the transmission further including means drivingly interconnecting the sun gear of the first stage differential gear with the sun gear of the second stage differential gear for unitary rotation, means for drivingly interconnecting the transfer ring gear with the planet gears of the second stage differential gear and means drivingly interconnecting the output ring gear with a variable torque load, the major torque flow branch extending from the transfer ring gear through the planet gears of the second stage differential gear to the output ring gear, and the minor torque flow branch extending from the sun gear of the first stage differential gear through the sun gear of the second stage differential gear, and from the sun gear of the second stage differential gear through the planet gears of the second stage differential gear to the output ring gear and being amplified and combined with the major torque flow branch through engagement between the sun gears, the planet gears and the output ring gear of the second stage differential gear.

7. A variable ratio transmission as constructed in accordance with claim 6 wherein the first stage differential gear includes a longitudinal axis and the second stage differential gear includes a longitudinal axis, the axes of the first and second stage differential gears being parallel to one another.

8. A variable ratio transmission, the transmission including a first stage differential gear, the first stage differential gear having a sun gear, a plurality of planet gears and a transfer ring gear, the planet gears engaging the sun gear and the transfer ring gear, means for interconnecting the planet gears with a rotary input, the first stage differential gear bifurcating the torque of the rotary input into a major torque flow branch and a minor torque flow branch, the major torque flow branch extending through the transfer ring gear and the minor torque flow branch extending through the sun gear, the variable ratio transmission further including a second stage differential gear, the second gear differential gear comprising a sun gear, a plurality of planet gears, a planet gear carrier and an output ring gear, the planet gears of the second stage differential gear engaging the sun gear and the output ring gear, the carrier of the second stage including means for mounting the planet gears of the second stage in mutually engaged pairs, the transmission further including means drivingly interconnecting the sun gear of the first stage differential gear with the sun gear of the second stage differential gear for unitary rotation, means for drivingly interconnecting the transfer ring gear with the planet gears of the second stage differential gear comprising means interconnecting the planet gear carrier with the transfer ring gear, the second stage differential gear further including means for drivingly interconnecting the output ring gear with a variable torque load, the major torque flow branch extending from the transfer ring gear through the planet gears of the second stage differential gear to the output ring gear, and the minor torque flow branch extending from the sun gear of the first stage differential gear through the sun gear of the second stage differential gear, and from the sun gear of the second stage differential gear through the planet gears of the second stage differential gear to the output ring gear and being amplified and combined with the major torque flow branch through engagement between the sun gears, the planet gears and the output ring gear of the second stage differential gear.

9. A variable ratio transmission as constructed in accordance with claim 8 wherein one of the planet gears of each mutually engaged pair includes more gear teeth than the other planet gear.

10. A variable ratio transmission as constructed in accordance with claim 8 wherein one of the planet gears of each pair engages the sun gear of the second stage differential gear and the other planet gear of each pair engages the output ring gear.

11. A variable ratio transmission as constructed in accordance with claim 8 wherein the means drivingly interconnecting the sun gear of the first stage differential gear with the sun gear of the second stage differential gear comprises a gear train.

12. A variable ratio transmission as constructed in accordance with claim 8 wherein the means drivingly interconnecting the transfer ring gear with the planet gears of the second stage differential gear comprises a torque amplifying gear train.

13. A variable ratio transmission as constructed in accordance with claim 8 wherein the means interconnecting the planet gears of the first stage differential gear with the rotary input comprises an input ring gear driven by the rotary input, each of the planet gears of the first stage differential gear comprising a first and a second axially spaced step, the first step having gear teeth and the second step having gear teeth, the gear teeth of the first step having a smaller pitch diameter than the gear teeth of the second step, the gear teeth of the first step engaging the input ring gear, the gear teeth of the second step engaging both the transfer ring gear and the sun gear of the first stage differential gear.

14. A variable ratio transmission, the transmission including a first stage differential, the first stage differential having a cage, means for drivingly connecting the cage with a rotary power input, at least one pair of opposed stepped bevel gears, the opposed stepped bevel gears being coaxial with one another and being rotatable relative to the cage within a plane transverse to a longitudinal axis of the first stage differential, one step of each stepped bevel gear having a smaller diameter than the other step, the first stage differential further including a transfer bevel gear, the transfer bevel gear being coaxial with the longitudinal axis, the one step being in driving engagement with the transfer bevel gear, the first stage differential including a further bevel gear, the further bevel gear being coaxial with the longitudinal axis, the other step of each stepped bevel gear being in driving engagement with the further bevel gear, the first stage differential bifurcating the torque of the rotary input into a major torque flow branch and a minor torque flow branch, the major torque flow branch extending through the one step to the transfer bevel gear and the minor torque flow branch extending through the other step to the further bevel gear, the variable ratio transmission further including a second stage differential, the second stage differential comprising a cage, at least one pair of opposed stepped bevel gears, the second stage stepped bevel gears being coaxial with one another and being rotatable relative to the second stage cage within a plane transverse to a longitudinal axis of the second stage bevel gear differential, the first and second stage differential gears having a common longitudinal axis, one step of each stepped bevel gear of the second stage bevel gear differential having a smaller diameter than the other step, the second stage differential including a further bevel gear coaxial with the longitudinal axis, the other step of each bevel gear of the second stage differential being drivingly engaged by the further bevel gear, the second stage differential further including an output bevel gear coaxial with the longitudinal axis, the output bevel gear being in driving engagement with the one step of each stepped bevel gear of the second stage differential, means drivingly interconnecting the output bevel gear with a variable torque load, the transmission further including a first shaft coaxial with the longitudinal axis, the first shaft drivingly interconnecting the further bevel gear of the first stage differential with the further bevel gear of the second stage differential and a second shaft coaxial with the longitudinal axis, the second shaft directly connecting the transfer bevel gear with the cage of the second stage differential for unitary rotation, the second shaft being hollow and the first shaft being positioned within the second shaft.

15. A variable ratio transmission as constructed in accordance with claim 14 wherein the stepped bevel gears of the first stage are carried on the cage of the first stage.

16. A variable ratio transmission as constructed in accordance with claim 15 wherein the stepped bevel gears of the second stage are carried on the cage of the second stage.

* * * * *